(12) United States Patent
Cheong

(10) Patent No.: US 7,159,610 B2
(45) Date of Patent: Jan. 9, 2007

(54) RELIEF VALVE

(75) Inventor: Hae Kyun Cheong, Pusan (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 5 days.

(21) Appl. No.: 10/860,166

(22) Filed: Jun. 3, 2004

(65) Prior Publication Data

US 2005/0178444 A1    Aug. 18, 2005

(30) Foreign Application Priority Data

Feb. 12, 2004   (KR) .................... 10-2004-0009301

(51) Int. Cl.
*F16K 31/383* (2006.01)
*F16K 17/10* (2006.01)
(52) U.S. Cl. .................... 137/491; 137/492.5; 251/118
(58) Field of Classification Search ................ 137/491, 137/492, 492.5, 544, 547, 550; 251/117, 251/118, 120, 121
See application file for complete search history.

(56) References Cited

U.S. PATENT DOCUMENTS

| 2,827,075 | A |  | 3/1958 | Mercier |  |
| 3,100,503 | A |  | 8/1963 | Tennis |  |
| 4,351,356 | A |  | 9/1982 | Koiwai et al. |  |
| 4,548,231 | A |  | 10/1985 | Schwede |  |
| 4,597,410 | A | * | 7/1986 | Wilke | 137/491 |
| 6,668,863 | B1 | * | 12/2003 | Maier | 138/42 |
| 6,745,792 | B1 | * | 6/2004 | Koo | 137/491 |
| 6,805,155 | B1 | * | 10/2004 | Slawinski et al. | 137/491 |

* cited by examiner

*Primary Examiner*—Ramesh Krishnamurthy
(74) *Attorney, Agent, or Firm*—Ladas & Parry LLP

(57) ABSTRACT

Disclosed is a relief valve, in which a flow rate of hydraulic fluid is not greatly changed even when temperature is changed, and thus providing smooth operation and preventing foreign materials contained in the hydraulic fluid from being introduced into the relief valve. The relief valve is comprised of a sleeve provided with a high-pressure inlet and a tank fluid channel; a main poppet provided with an inflow fluid passage and a back pressure chamber; an annular fluid passage provided on a front end of the main poppet; a seat provided with a seat fluid channel communicating with the back pressure chamber; and a pilot poppet communicating the seat fluid channel with the tank fluid channel.

3 Claims, 3 Drawing Sheets (a) (b)

RELIEF VALVE

BACKGROUND OF THE INVENTION

1. Field of the Invention

The present invention relates to a relief valve, in which a main poppet is provided with an inflow fluid passage and an annular fluid passage communicating a high-pressure inlet and a back pressure chamber, so that a flow rate of hydraulic fluid is not greatly changed even when temperature is changed, and thus providing smooth operation and preventing foreign materials contained in the hydraulic fluid from being introduced into the relief valve.

2. Description of the Related Art

In general, heavy equipment such as an excavator, a payloader, a skidder, etc., which is operated with a hydraulic pressure employs a hydraulic system in order to drive various working tools mounted thereon by use of hydraulic fluid supplied from a hydraulic pump. The hydraulic system of the heavy equipment is provided with a relief valve which functions to regulate the maximum pressure in order to protect the entire hydraulic system including a driving source from an overload.

The relief valve is one of pressure control valves, which discharge a part or total of fluid when a pressure of the hydraulic system reaches a setting pressure of the valve, thereby performing a function of keeping the pressure in the hydraulic system under a set value. The relief valve is capable of changing the setting pressure, so that it can cope with the case of changing the actuator of the equipment.

FIG. 1 illustrates a cross-sectional view of a conventional relief valve.

According to the conventional relief valve 100, hydraulic fluid is supplied from a hydraulic pump 200 to a high-pressure inlet 111 of the relief valve 100, so that the whole pressure of a hydraulic system is exerted on the high-pressure inlet 111. The relief valve discharges the hydraulic fluid from the high-pressure inlet 111 toward a tank 201 when the pressure of the high-pressure inlet 111 reaches a predetermined pressure or more, thereby protecting the hydraulic system from an overload.

The relief valve 100 is comprised of a sleeve 110, and a main body 180 coupled to the sleeve 110. The sleeve 110 is provided therein with a main poppet 120, a main poppet spring 122, a second orifice body 130 and a seat 140.

The main poppet 120 is provided with a first orifice 121 at a central portion thereof, and is fitted to be movable in a longitudinal direction in the sleeve 110. The main poppet spring 122 resiliently supports the main poppet 120.

Further, the main poppet spring 122 has a rear end supported by the second orifice body 130. The second orifice body 130 is installed so that its rear end is supported on the seat 140. The second orifice body 130 is provided with a second orifice 131 which passes through the central portion of the second orifice body 130.

The main body 180 coupled with the sleeve 110 is provided therein with a pilot poppet 150, a pilot poppet spring 160, and an adjustable piston 170. The pilot poppet 150 is resiliently supported by the pilot poppet spring 160, and is provided to be movable in a longitudinal direction. The pilot poppet spring 160 is supported by the adjustable piston 170 on a rear end thereof.

The pilot poppet 150 takes a conical shape, and is brought into contact with the seat surface 141 of the seat 140 by a spring force of the pilot poppet spring 160, thus functioning to open/close the seat fluid channel 142.

The adjustable piston 170 supporting the pilot poppet spring 160 is capable of moving relative to the main body 180 and is fixed to the main body 180 by a fixing nut 171. Thus, user can change the setting pressure of the relief valve 100, by moving the adjustable piston 120 left or right to adjust the tension of the pilot poppet spring 160, and then fastening the fixing nut 171 to fix the adjustable piston 170 to the sleeve 110.

There is provided a tank inlet 181 connected to a tank fluid channel 112 in the rear of the pilot poppet 150. When the pilot poppet 150 opens the seat 140, the hydraulic fluid, which has passed through a seat fluid channel 142, is discharged through the tank inlet 181 to the tank 201.

The following description will be made regarding the operation of the relief valve having the foregoing construction. Hereinafter, a pressure exerted on the side of the high-pressure inlet 111 by the hydraulic fluid from the hydraulic pump 200 is referred to as a "inlet side pressure", and a pressure exerted on a space 120a of the main poppet 120 before the hydraulic fluid passing through the first orifice 121 of the main poppet 120 is introduced into the second orifice 131 is referred to as a "chamber side pressure".

The hydraulic fluid from the hydraulic pump 200 is introduced into the space 120a of the main poppet 120 via the high-pressure inlet 111 and the first orifice 121. When the inlet side pressure is lower than the setting pressure set by the pilot poppet spring 160, the pilot poppet 150 is brought into contact with the seat surface 141 by the spring force of the pilot poppet spring 160. Hence, the hydraulic fluid of the space 120a does not flow into the second orifice 131, so that the inlet side pressure is maintained to be equal to the chamber side pressure.

Here, since the pressure receiving area of the main poppet 120 on which the inlet side pressure is exerted is smaller than that of the main poppet 120 on which the chamber side pressure is exerted, the main poppet 120 is supported toward the right side in the sleeve 110 by the main poppet spring 122. Thus, the tank fluid channel 112 is kept closed by the main poppet 120.

Meanwhile, when the working tool (not shown) of the heavy equipment reaches the maximum stroke, system pressure of the heavy equipment is increased. Thus, the pressure on the side of the high-pressure inlet 111 is increased, so that both the inlet side pressure and the chamber side pressure reaches a pressure higher than the setting pressure set by the pilot poppet spring 160. At this time, the hydraulic fluid reacts against the spring force of the pilot poppet spring 160 to move the pilot poppet 150 to the left side, so that the seat fluid channel 142 of the seat 140 is opened.

Therefore, since the hydraulic fluid is returned to the tank 201 via the seat fluid channel 142 and the tank inlet 181, the hydraulic fluid introduced into the space 120a through the first orifice 121 is subjected to resistance. As a result, the chamber side pressure becomes lower than the inlet side pressure. If so, the force applied to the pressure receiving surface of the main poppet 120 on which the inlet side pressure is exerted exceeds the force applied to the pressure receiving surface of the main poppet 120 on which the chamber side pressure is exerted. Accordingly, the main poppet 120 moves to the left side, and the hydraulic fluid is returned through the tank fluid channel 112 to the tank 201.

The viscosity of hydraulic fluid used in the hydraulic system is changed according to a temperature. Specifically, when the equipment is used in winter, the viscosity of the hydraulic fluid is increased as the temperature is lowered. On the other hand, when the equipment is used in summer, the viscosity of the hydraulic fluid is lowered as the temperature is increased. Therefore, as the viscosity of the hydraulic fluid is greatly changed due to the temperature change, the variation of a flow rate of the hydraulic fluid passing through the fluid channel is increased.

It is well known that failures occurring at hydraulic equipment are, for the most part, due to the contamination of the oil used as the hydraulic fluid. The hydraulic fluid circulating the interior of the hydraulic system contains foreign materials such as dust, air, etc. For instance, fine particulates such as dusts block drain openings or fluid channels, thus resulting from malfunction. In addition, the foreign materials such as molding sands are introduced into a pressure chamber of the relief valve, thus obstructing the operation of the main poppet or causing damage of the seat.

According to the conventional relief valve 100, the fluid passage, through which the hydraulic fluid of the high-pressure inlet 111 is introduced into the space 120a in the rear of the main poppet 120, is formed by the first orifice 121 provided on the front end of the main poppet 120. For this reason, the foreign materials contained in the hydraulic fluid are introduced into the interior of the relief valve 100 through the first orifice 121, so that operation of the relief valve is deteriorated.

In order to solve the problem caused by the foreign materials contained in the hydraulic fluid, a tank filter is fitted on the entry portion of the hydraulic pump, or an oil filter functioning as a line filter is fitted in the pipes of the hydraulic pump. Nevertheless, many foreign materials are still contained in the hydraulic fluid. Furthermore, the oil filter used in the hydraulic system is expensive, which acts as a cause of increasing production costs as well as the number of parts.

SUMMARY OF THE INVENTION

To solve the foregoing problems, the present invention is directed to provide a relief valve capable of guaranteeing smooth operation by preventing a great change in a flow rate of hydraulic fluid passing through a fluid channel despite of a change in temperature and preventing foreign materials contained in the hydraulic fluid from being introduced into the relief valve.

To achieve the above objective, the present invention provides a relief valve where a main poppet is provided with an inflow fluid passage and an annular fluid passage communicating a high-pressure inlet with a back pressure chamber.

The relief valve according to the present invention is comprised of a sleeve provided with a high-pressure inlet to which hydraulic fluid is supplied from a pump, and a tank fluid channel through which the hydraulic fluid of the high-pressure inlet is returned to a tank. A main poppet is provided with an inflow fluid passage communicating with the high-pressure inlet in a front thereof and a back pressure chamber in a rear thereof. The main poppet is resiliently supported by a main poppet spring, and is provided in the sleeve to open/close the high-pressure inlet and the tank fluid channel. An annular fluid passage is provided on a front end of the main poppet to communicate the inflow fluid passage with the back pressure chamber. A seat is provided in the rear of the main poppet to support a rear end of the main poppet spring, and is provided with a seat fluid channel communicating with the back pressure chamber. And, a pilot poppet is resiliently supported by a pilot poppet spring, is provided to open/close the seat fluid channel, and communicates the seat fluid channel with the tank fluid channel.

Preferably, the inflow fluid passage is formed inside the passage seat coupled to the front end of the main poppet, and the annular fluid passage is defined by an inner wall of the main poppet and an outer wall of the passage seat.

More preferably, the inflow fluid passage includes a central passage which passes through the center of the passage seat in a forward direction and which communicates with the high-pressure inlet, and a vertical passage which passes through the passage seat in a substantially vertical direction and which communicates with the annular fluid passage.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
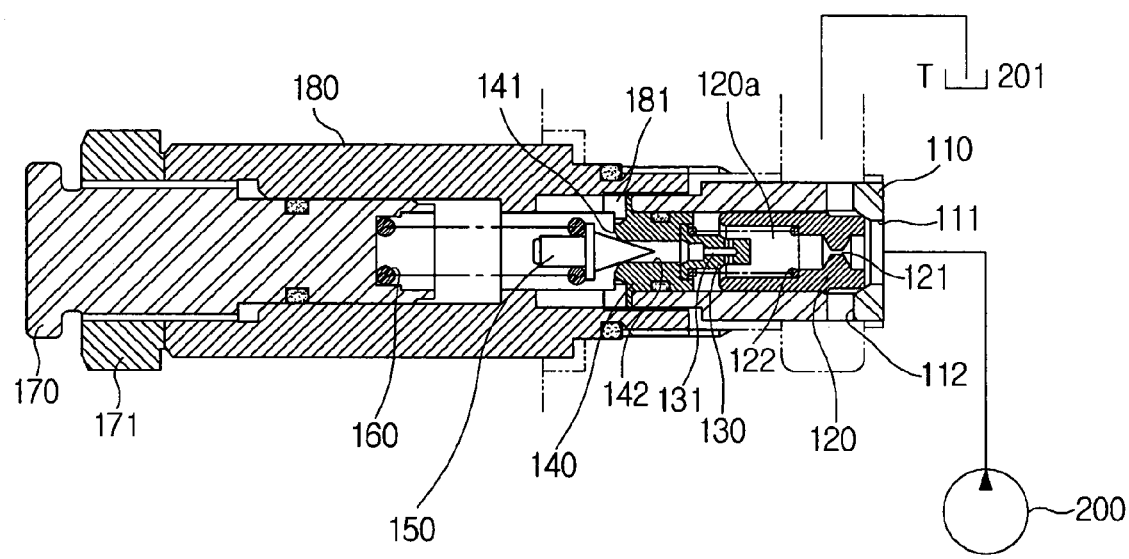
FIG. 1 illustrates a cross-sectional view of a conventional relief valve.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
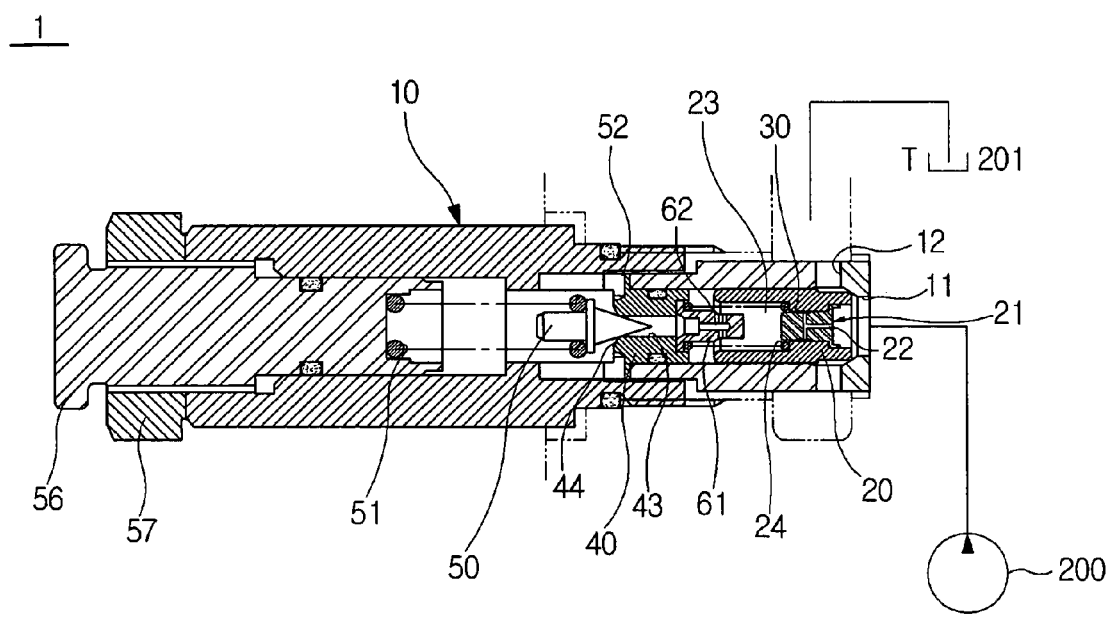
FIG. 2 illustrates a side cross-sectional view of a relief valve according to a preferred embodiment of the present invention.
Figure 3:
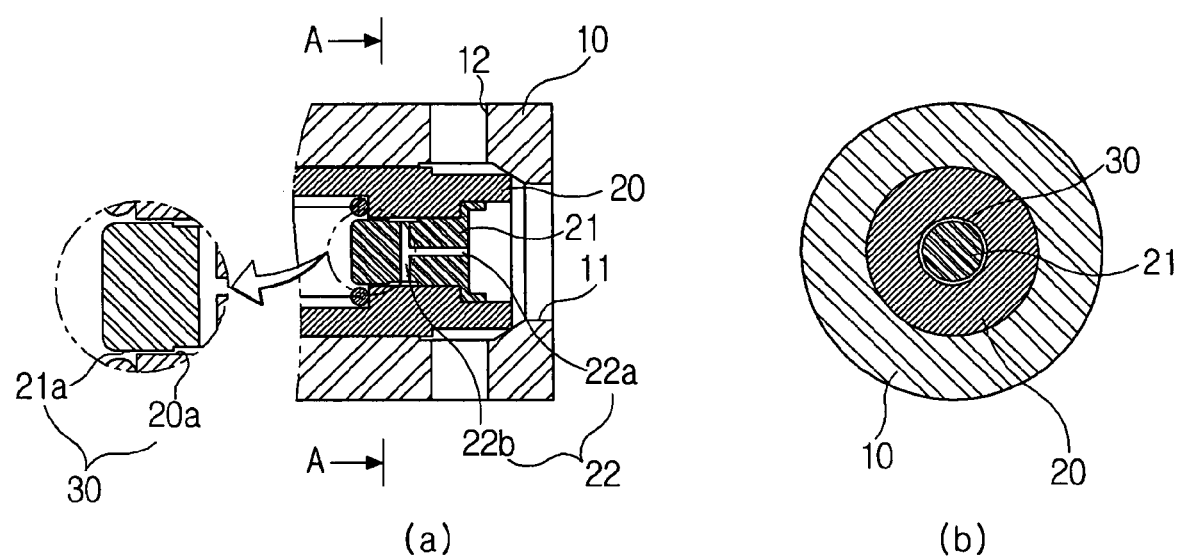
FIG. 3 is a partially magnified view of FIG. 2.

FIG. 2 illustrates a side cross-sectional view of a relief valve 1 according to a first embodiment of the present invention. FIG. 3 is a partially magnified view of FIG. 2, in which FIG. 3a is a partial magnified side view, and FIG. 3b is a cross-sectional view taken along line A—A of FIG. 3a.

The relief valve 1 is comprised of a sleeve 10, a main poppet 20 which is movably fitted in the sleeve 10, an annular fluid passage 30 which is provided in the front of the main poppet 20, a seat 40 which is fitted in the rear of the main poppet 20, and a pilot poppet 50.

The relief valve 1 is provided with a high-pressure inlet 11 through which hydraulic fluid is supplied from a hydraulic pump 200, and the main poppet 20 which opens/closes a tank fluid channel 12 connected to a tank 201. If the pressure of the high-pressure inlet 11 exceeds the setting pressure of the relief valve 1, the main poppet 20 discharges the hydraulic fluid of the high-pressure inlet 11 toward the tank 201. Thereby, the relief valve serves to keep the pressure of an entire hydraulic system under a given value.

A front end of the sleeve 10 is provided with the high-pressure inlet 11 through which the hydraulic fluid of the hydraulic pump 200 is supplied, and the tank fluid channel 12. The tank fluid channel 12 is connected with the high-pressure inlet 11 so as to discharge the hydraulic fluid of the high-pressure inlet 11 toward the tank 201.

The main poppet 20 is resiliently supported by a main poppet spring 24, and is movably fitted in the sleeve 10 so that the high-pressure inlet 11 and the tank fluid channel 12 can be opened/closed. As seen from the Figure, when the main poppet 20 moves to the right side, a front end of the main poppet 20 blocks connection between the high-pressure inlet 11 and the tank fluid channel 12. However, when the main poppet 20 moves to the left side, the front end of the main poppet 20 connects the high-pressure inlet 11 with the tank fluid channel 12, so that the hydraulic fluid from the high-pressure inlet 11 is discharged to the tank fluid channel 12.

The main poppet 20 is provided with an inflow fluid passage 22 on the front end thereof, and a back pressure chamber 23 in the rear thereof. A rear end of the main poppet 20 is resiliently supported by the main poppet spring 24, so that the main poppet 20 is movable in the sleeve 10. The inflow fluid passage 22 of the main poppet 20 is communicated with the high-pressure inlet 11. The front end of the main poppet 20 is provided with an annular fluid passage 30 communicating the inflow fluid passage 22 and the back pressure chamber 23.

As shown in FIG. 3a, the inflow fluid passage 22 is formed inside a passage seat 21 coupled to the front end of the main poppet 20, and is composed of a central passage 22a which passes through the central portion of the passage seat 21 in a forward direction to communicate with the high-pressure inlet 11, and a vertical passage 22b which passes through the passage seat 21 in a substantially vertical direction to communicate with the annular fluid passage 30. The annular fluid passage 30 is defined by the inner wall 20a of the main poppet 20 and an outer wall 21a of the passage seat 21.

As shown in FIG. 3b, the annular fluid passage 30 takes an annular ring shape in cross section. This provides an advantage that the flow rate is not greatly changed according to a change in viscosity of the hydraulic fluid as compared with the passage having a circular cross section.

Therefore, even when environment temperature has changed greatly, the flow rate of the hydraulic fluid introduced into the back pressure chamber 23 via the inflow fluid passage 22 and the annular fluid passage 30 is not greatly changed, so that the function of the relief valve 1 can be smoothly performed without being influenced by the temperature.

Further, the annular fluid passage 30 performs a function as a filter which prevents the foreign materials contained in the hydraulic fluid from passing through, thus preventing the foreign materials from flowing into the relief valve 1. Consequently, the annular fluid passage 30 protects the relief valve 1.

The main poppet spring 24, which resiliently supports the rear end of the main poppet 20, is supported by a second orifice body 61, which is supported by the seat 40. The rear end of the seat 40 is fixed to the sleeve 10, and the rear end of the second orifice body 61 is seated in the front end of the seat 40, thus stably supporting the main poppet spring 24. As a result, the main poppet 20 is kept forced toward the high-pressure inlet 11 by the main poppet spring 24.

A second orifice 62 is formed to pass through the center of the second orifice body 61 and is connected with the back pressure chamber 23. Further, a seat fluid channel 43 is formed to pass through the center of the seat 40 and communicates with the second orifice 62.

Also, the rear end of the seat 40 is provided with a seat surface 44, which extends outside the seat fluid channel 43. In the rear of the seat 40, a tank inlet 52 is formed to communicate with the tank fluid channel 12. Thus, the sleeve 10 is provided therein with a fluid channel through which the hydraulic fluid from the high-pressure inlet 11 passes in turn the inflow fluid passage 22, the annular fluid passage 30, the back pressure chamber 23, the second orifice 62, the seat fluid channel 43 and the tank inlet 52.

The pilot poppet 50 is resiliently supported by the pilot poppet spring 51, thus being movably mounted in the sleeve 10. The pilot poppet 50 takes a conical shape on its front end and is pressed by a spring force of the pilot poppet spring 51 thus to come into contact with the seat surface 44 of the seat 40, thereby opening/closing the seat fluid channel 43. Thus, the pilot poppet 50 functions to connect/block the seat fluid channel 43 and the tank inlet 52.

The rear end of the pilot poppet 50 is supported by an adjustable piston 56 which is movably mounted on the sleeve 10. The adjustable piston 56 is fixed to the sleeve 10 by a fixing nut 57. Thus, user can change the setting pressure of the relief valve 1, by positioning the adjustable piston 56 relative to the sleeve 10 on the left/right side, adjusting the tensile force of the pilot poppet spring 51, and fixing the adjustable piston 56 by means of the fixing nut 57. Thus, as the compressed state of the pilot poppet spring 51 is constantly maintained, the setting pressure of the relief valve 1 is set to a desired pressure.

The following description will be made regarding an operation of the relief valve 1 constructed as set forth above. The hydraulic fluid from the hydraulic pump 200 is introduced into the back pressure chamber 23 of the main poppet 20 via the high-pressure inlet 11, the inflow fluid passage 22 and the annular fluid passage 30.

When a pressure on the side of the high-pressure inlet 11 is lower than the setting pressure set by the pilot poppet spring 51, the pilot poppet 50 is brought into contact with the seat surface 44 by the spring force of the pilot poppet spring 51. Hence, the hydraulic fluid of the back pressure chamber 23 does not flow into the second orifice 62, so that the pressure on the side of the high-pressure inlet is maintained to be equal to a pressure on the side of the back pressure chamber 23. Thus, the main poppet 20 is supported toward the right side in the sleeve 10 by the main poppet spring 24. Thereby, the tank fluid channel 12 is kept closed by the main poppet 20.

Meanwhile, when the pressure of the hydraulic system is increased, the pressure on the side of the high-pressure inlet 11 is increased, so that both the inlet side pressure and the chamber side pressure reaches a pressure higher than the setting pressure set by the pilot poppet spring 51. At this time, the hydraulic fluid reacts against the spring force of the pilot poppet spring 51 to move the pilot poppet 50 to the left side, so that the seat fluid channel 43 of the seat 40 is opened.

Therefore, since the hydraulic fluid is returned to the tank 201 via the seat fluid channel 43 and the tank inlet 52, the hydraulic fluid introduced through the inflow fluid passage 22 and the annular fluid passage 30 into the back pressure chamber 23 is subjected to resistance. As a result, the chamber side pressure becomes lower than the inlet side pressure. In that case, the main poppet 20 moves to the left side, and the hydraulic fluid is returned through the tank fluid channel 12 to the tank 201.

The annular fluid passage 30, which causes the hydraulic fluid on the side of the high-pressure inlet 11 to flow into the back pressure chamber 23, has the annular ring shape in section, so that the flow rate passing through the annular fluid passage 30 is not greatly changed according to the viscosity change of the hydraulic fluid. Thus, even when the temperature is greatly changed during operation of the relief valve 1, the flow rate of the hydraulic fluid introduced into the back pressure chamber 23 is not greatly changed.

Accordingly, the relief valve 1 can smoothly perform its function without being influenced by the temperature.

Further, the annular fluid passage 30 performs the function as a filter capable of preventing the foreign materials contained in the hydraulic fluid from being introduced into the relief valve, thus serving to protect the relief valve 1.

According to the relief valve as set forth above, the main poppet is provided with the inflow fluid passage and the annular fluid passage which communicate the high-pressure inlet with the back pressure chamber of the relief valve, so that the flow rate passing through the fluid passages is not greatly changed even when the temperature is changed. As a result, the relief valve is smoothly operated, and the foreign materials contained in the hydraulic fluid are not introduced into the relief valve.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A relief valve comprising:
   a sleeve (10) provided with a high-pressure inlet (11) for hydraulic fluid to be supplied from a pump, and a tank fluid channel (12) for the hydraulic fluid of the high-pressure inlet to be returned to a tank;
   a main poppet (20) in the sleeve, provided with a back pressure chamber (23) in a rear thereof and resiliently supported by a main poppet spring (24) to open/close the high-pressure inlet to the tank fluid channel;
   a passage seat (21) coupled to a front end of the main poppet to provide an inflow fluid passage (22) communicating with the high-pressure inlet and an annular fluid passage (30) defined by an inner wall of the main poppet and an outer wall of the passage seat between the inflow fluid passage and the back pressure chamber;
   a seat (40) to the rear of the main poppet to support a rear end of the main poppet spring and provided a seat fluid channel (43) communicating with the back pressure chamber; and
   a pilot poppet (50) resiliently supported by a pilot poppet spring (51) to open/close the seat fluid channel.

2. The relief valve as set forth in claim 1, wherein the inflow fluid passage includes a central passage which passes through the center of the passage seat in a forward direction and which communicates with the high-pressure inlet, and a vertical passage which passes through the passage seat in a substantially vertical direction and which communicates with the annular fluid passage.

3. In a relief valve comprising a sleeve provided with a high-pressure inlet for hydraulic fluid to be supplied from a pump, and a tank fluid channel for the hydraulic fluid of the high-pressure inlet to be returned to a tank, a main poppet in the sleeve, which is provided with a back pressure chamber in a rear thereof and is resiliently supported by a main poppet spring to open/close the high-pressure inlet and the tank fluid channel, a seat provided to the rear of the main poppet to support a rear end of the main poppet spring, which is provided with a seat fluid channel and a second orifice body for the hydraulic fluid to be communicated with the back pressure chamber, a pilot poppet resiliently supported by a pilot poppet spring to open/close the seat fluid channel, the improvements comprising:
   a passage seat fixed in an inner front end of the main poppet and which comprises an annular fluid passage and an inflow fluid passage;
   wherein the annular fluid passage is defined by an inner wall of the main poppet and an outer wall of the passage seat to communicate the back pressure camber with the high-pressure inlet;
   the inflow fluid passage includes a central passage in a forward direction thereof, which is to pass the hydraulic fluid through the center of the passage seat and communicate with the high-pressure inlet, and a vertical passage in a substantially vertical direction thereof, which is to pass the hydraulic fluid through the passage seat and communicate with the annular fluid passage, so that the hydraulic fluid is being introduced through the inflow fluid passage and the annular fluid passage when the hydraulic fluid is returned to the tank via the seat fluid channel and the tank inlet.

* * * * *